(12) United States Patent
Choo et al.

(10) Patent No.: US 8,003,144 B2
(45) Date of Patent: Aug. 23, 2011

(54) SPECIALTY PALM OIL PRODUCTS AND OTHER SPECIALTY VEGETABLE OIL PRODUCTS

(75) Inventors: Yuen May Choo, Selangor (MY); Ah Ngan Ma, Selangor (MY); Yusof Basiron, Selangor (MY); Chiew Wei Puah, Selangor (MY)

(73) Assignee: Malaysian Palm Oil Board, Selangor (MY)

( * ) Notice: Subject to any disclaimer, the term of this patent is extended or adjusted under 35 U.S.C. 154(b) by 1702 days.

(21) Appl. No.: 11/214,974

(22) Filed: Aug. 31, 2005

(65) Prior Publication Data

US 2006/0088644 A1    Apr. 27, 2006

(30) Foreign Application Priority Data

Sep. 1, 2004 (MY) ................................ PI 20043558

(51) Int. Cl.
*A23D 9/02* (2006.01)
*A23D 9/007* (2006.01)
(52) U.S. Cl. ............. 426/417; 426/490; 554/8; 424/727
(58) Field of Classification Search .................. 426/417, 426/490
See application file for complete search history.

(56) References Cited

U.S. PATENT DOCUMENTS

| | | | |
|---|---|---|---|
| 5,019,668 A | 5/1991 | Keat et al. | |
| 5,523,420 A * | 6/1996 | Lowack et al. | 549/411 |
| 5,843,499 A * | 12/1998 | Moreau et al. | 426/2 |
| 5,902,890 A | 5/1999 | Nitsche et al. | |
| 6,106,879 A * | 8/2000 | Mori et al. | 426/438 |
| 6,177,114 B1 | 1/2001 | Unnithan | |
| 6,495,536 B1 | 12/2002 | Masui et al. | |
| 6,586,201 B1 | 7/2003 | May et al. | |
| 6,656,358 B2 * | 12/2003 | May et al. | 210/635 |
| 2002/0045000 A1 | 4/2002 | Nakajima et al. | |
| 2003/0054082 A1 | 3/2003 | Koike et al. | |
| 2005/0234248 A1 * | 10/2005 | Kossler et al. | 549/413 |

FOREIGN PATENT DOCUMENTS

| | | |
|---|---|---|
| EP | 0349138 | 1/1990 |
| EP | 0990391 | 4/2000 |
| GB | 2218989 | 11/1989 |
| MY | 104059 A | 11/1993 |
| MY | 110779 A | 4/1999 |

OTHER PUBLICATIONS

Ibanez, E. 2002. JAOCS 79(12)1255.*
Lee, H. 1991. JAOCS 68(8)571.*
Mendes, M. 2002. Journal of Supercritical Fluids 23:257.*

* cited by examiner

*Primary Examiner* — Carolyn A Paden
(74) *Attorney, Agent, or Firm* — Finnegan, Henderson, Farabow, Garrett & Dunner, L.L.P.

(57) ABSTRACT

The invention relates to vegetable oil products, including palm oil products, containing one or more constituents from a group which includes monoacylglycerols, diacylglycerols, triacylglycerols, carotenes, tocols, phytosterols, squalene and free fatty acids, from vegetable oil sources and a process for the production thereof by using supercritical fluid extraction.

31 Claims, No Drawings

SPECIALTY PALM OIL PRODUCTS AND OTHER SPECIALTY VEGETABLE OIL PRODUCTS

FIELD OF INVENTION

The present invention relates to vegetable oil products including palm oil and palm kernel oil products containing one or more constituents and a process for producing vegetable oil products using supercritical fluid extraction.

BACKGROUND ART

Consumers' growing demand for additional health benefits from the food they consume have changed the food industry over the past decade. The changing lifestyle has led to the search of enrichment of vitamins or pharmaceuticals in food products to provide specific health benefits. The aspiration for greener and cleaner food processing technology has also contributed to the enormous changes.

Crude palm oil (CPO) consists by weight of >90% of triacylglycerols, 2-7% of diacylglycerols, <0.1% of monoacylglycerols, 3-5% of free fatty acids and 1% of minor constituents. These minor constituents include carotenes (500-700 ppm), tocols which include tocopherols, tocotrienols and tocoenol (600-1000 ppm), phytosterols (campesterol, stigmasterol and β-sitosterol) (250-620 ppm), and squalene (200-500 ppm). Thus, this provides a source for the production of a range of palm oil products which may be referred to as specialty palm oil products. Likewise, specialty palm kernel oil products may also be obtained from crude palm kernel oil.

Excess calorie intake has been directly linked to the increase in obesity and coronary heart diseases. This has led to the search for low calorie dietary food or fat substitutes. Research has focused on limiting fat digestion and/or absorption and thus maintaining lower body weight, lower body fat accumulation in a healthy manner and regulating post-meal blood lipids. Diacylglycerols oil has been generally recognized as safe (GRAS) in the United States. It provides 38.9 kJ/g of energy as compared to the 39.6 kJ/g provided by triacylglycerols. The absorption and metabolism of diacylglycerols differs from triacylglycerols thus reducing fat absorption for healthier body. Kao Corporation of Japan introduced diacylglycerols cooking oil that looks and tastes like conventional edible oil. The oil also contains phytosterols. These were disclosed in U.S. Pat. No. 6,495,536, US2002045000 and US2003054082 Patents. One of the processes used to obtain the diacylglycerols oil is by hydrolyzing fats and oils, distilling the hydrolyzation product to produce fatty acids and glycerin and esterifying in the presence of enzyme (Patent EP0990391). Generally, the process involves enzyme catalysed esterification of fatty acids derived from natural fats and oils and either monoacylglycerols or glycerol.

However, partial acylglycerols (monoacylglycerols and diacylglycerols) have been known to cause turbidity and cloudiness in edible oil upon prolonged storage even at room temperature due to crystallization of the acylglycerols. Although the quality of the oil remains the same, consumers perceive otherwise. Thus many processes have been developed to produce low partial acylglycerols oil. These include solvent-solvent partition, interesterification in the presence of catalyst and by the use of additives. However, these processes involved numerous steps and the use of hazardous chemicals in one way or another.

Palm oil is the richest plant source of carotenes with concentration of 500-700 ppm. Carotenes are important anti-oxidant by scavenging free radicals and as singlet oxygen quencher. Carotenes are also found to be capable of inhibiting the growth of certain cancer cells such as the lungs and colon cancers. Major carotenes in palm oil—α- and β-carotenes are pro-vitamin A. Vitamin A is useful in preventing xeropthlamia, a night blindness disease.

Current refining technology for the production of refined palm oil destroys carotenes which is present in CPO. In view of the growing importance of carotenes initiative has been taken to recover them prior to refining. These include the use of adsorbent, resin, saponification, crystallization, solvent extraction and chromatographic methods, etc. However, these processes involve the use of organics solvents and chemicals modification in one way or another and do not produce an edible oil enriched with carotenes.

Amongst the most relevant work for the production of high carotenes palm oil that has been disclosed is a process developed by Malaysian Palm Oil Board (Patent MY 104059A) to retain >90% carotenes in the edible oil. The process produces carotenes with concentration less than 0.12%. The process involves numerous steps including degumming, bleaching and mild deacidification with molecular distillation, a gentle distillation process. Another process for the production of high carotenes is disclosed in U.S. Pat. No. 6,177,114. However, the process described involves subjecting the oil to high temperature of 290° C. which is not cost effective.

In some known processes for the production of carotenes concentrate, the palm oil was first catalytically esterified and/or transesterified and then subjected to distillation. The second step includes saponification and evaporation to obtain carotenes as disclosed in U.S. Pat. No. 5,902,890. In U.S. Pat. No. 5,019,668 and EP0349138 Patents, palm oil was esterified and/or transesterified and mixed with edible oil followed by distillation to produce carotenes. GB2218989 Patent comprises steps of (i) esterification of oil (ii) converting the glycerides into monoesters by transesterification, (iii) adsorbing the non-glyceride constituents onto a selective absorbent and (iv) thereafter desorbing the glyceride constituents from the adsorbent with the use of solvent to recover carotenes, and also tocols and sterols.

Tocopherols are important due to their Vitamin E activity. Tocols are useful in protection against skin damage and aging by ultraviolet (UV) radiation. They also exhibit cholesterol-lowering effect. Tocotrienols (>75% of tocols in CPO) have been found to be more powerful anti-oxidant than tocopherol.

GB Patent 2218989 as discussed also produced tocols from esterified palm oil. High concentration of tocols from palm oil by-products is produced as in Patent MY 110779A by (i) catalytic conversion of free fatty acids and acylglycerols in palm fatty acids distillates into esters, (ii) separating tocols from ester, (iii) concentrating tocols by ion-exchange resin and distillation. Both processes disclosed involve esterifying the palm oil and its by-products prior to adsorption on adsorbent such as activated alumina, activated carbon, or silica and ion exchange resins, respectively. These therefore involve a number of steps and adsorption and/or desorption with usage of solvents.

The isolation of phytosterols and squalene from palm oil are disclosed in GB22 18989 and U.S. Pat. No. 6,586,201. These processes involve the use of adsorbents and solvents.

The soapstock by-product from chemical refining of edible vegetable oils such as soybean provides the cheap and readily available supply of fatty acids. The soapstocks cannot be used directly for end uses because of the presence of oxidized contaminants (e.g. carbonyls and peroxides), neutral oil, salts and large quantities of water. The crude soapstocks have a relatively high level of non-hydrolyzeable phospholipids from degumming, thus are more difficult to acidulate.

The soapstocks acidulation process involves numerous steps and the usage of hazardous chemicals. In view of these, one single step process is sought to produce free fatty acids which can be used for oleochemicals industry.

The present invention overcomes the shortcomings of the prior art by providing a process for the production of vegetable oil products including palm oil products and palm kernel oil products containing one or more constituents from a group which includes monoacylglycerols, diacylglycerols, triacylglycerols, carotenes, tocols, phytosterols, squalene and free fatty acids, which is simple, efficient and free from hazardous solvents and chemical processes.

SUMMARY OF INVENTION

According to one aspect of the invention, there is provided a process for producing vegetable oil products containing one or more constituents from a group which includes monoacylglcerols, diacylglycerols, triacylglycerols, carotenes, tocols (which may comprise, inter alia, tocopherols or tocotrienols or tocoenol, or a combination thereof), phytosterols (which may comprise, inter alia, campesterol or stigmasterol or β-sitosterol, or a combination thereof), squalene and free fatty acids by extracting the constituents from vegetable oil sources wherein selective extraction of constituents which are desired and removal of unwanted constituents and impurities are achieved by manipulating relative solubilities of the constituents and impurities in the supercritical fluid. The process is able to extract out individually monoacylglycerols, diacylglycerols and triacylglycerols. The process is also able to extract out individually at least some of the sub-constituents for other constituents. For example, in the case of tocols, the process is able to extract out individually, inter alia, tocopherols, tocotrienols and tocoenol. Another example is in the case of phytosterols wherein the process is able to extract out individually, inter alia, campesterol, stigmasterol and β-sitosterol.

No adsorbents are used for the extraction of the desired constituents by the supercritical fluid.

Examples of supercritical fluids which may be used for the process are carbon dioxide, propane, ethylene, propylene, or a mixture thereof. Carbon dioxide is one of the preferred supercritical fluids to be used for the process.

The supercritical fluid may be used without any entrainer. However, at times it may be appropriate to use an entrainer. For example, food grade ethanol may be used as an entrainer when extracting carotenes or tocols. The percentage by weight of the entrainer may be, for example, 0.1%-4% of the weight of the supercritical fluid.

The relative solubilities of the constituents and impurities in the supercritical fluid may be manipulated by suitably adjusting parameters such as temperature, pressure, ratio of the supercritical fluid to feed material, flow rate of the supercritical fluid and composition of the supercritical fluid.

Depending on inter alia changes in operating conditions and the desired compositions of the vegetable oil products, it is preferred at times to keep temperature, pressure, flow rate of the supercritical fluid and composition of the supercritical fluid constant throughout the duration of the process. At other times, however, again depending inter alia on changes in operating conditions and the desired compositions of the vegetable oil products, it may be desirable to vary one or more of the aforesaid parameters during the duration of the process. Thus at times, gradient pressure or gradient temperature, for example, may be applied whilst the other parameters remain constant during the duration of the process. For example, in cases where a large amount of impurities or interfering substances or constituents which are not desired are present, a gradient pressure may be applied during the duration of the process to remove the impurities, interfering substances and/or undesirable constituents. In such cases, using constant pressure would require a very high pressure to be applied in order to remove the impurities, interfering substances and/or undesirable constituents and this would not be efficient and cost-effective.

Preferred ranges of temperature and preferred ranges of pressure used when the supercritical fluid is carbon dioxide are described in the following paragraphs.

The temperature used is preferably not more than 120° C. and more preferably in the range of between 25° C. and 120° C. The pressure used is preferably not more than 60 MPa (600 bar) and more preferably in the range of between 8 MPa (80 bar) and 60 MPa (600 bar).

The selective extraction of monoacylglycerols in the process is preferably carried out by using a temperature of between 30° C. and 80° C., and a pressure of between 8 MPa (80 bar) and 20 MPa (200 bar).

The selective extraction of diacylglycerols in the process is preferably carried out by using a temperature of between 30° C. and 80° C., and a pressure of between 18 MPa (180 bar) and 30 MPa (300 bar) but more preferably a pressure of between 18 MPa (180 bar) and 26 MPa (260 bar).

For the selective extraction of triacylglycerols in the process, it is preferable to use a temperature of between 30° C. and 80° C., and a pressure of between 10 MPa (100 bar) and 40 MPa (400 bar).

For the selective extraction of carotenes in the process, it is preferable to use a temperature of between 30° C. and 80° C., and a pressure of between 22 MPa (220 bar) and 40 MPa (400 bar) but more preferably a pressure of between 25 MPa (250 bar) and 40 MPa (400 bar).

The selective extraction of tocols in the process is preferably carried out by using a temperature of between 30° C. and 80° C., and a pressure of between 10 MPa (100 bar) and 25 MPa (250 bar).

The selective extraction of phytosterols in the process is preferably carried out by using a temperature of between 30° C. and 80° C., and a pressure of between 8 MPa (80 bar) and 22 MPa (220 bar).

For the selective extraction of squalene in the process, it is preferable to use a temperature of between 30° C. and 80° C., and a pressure of between 8 MPa (80 bar) and 30 MPa (300 bar) but more preferably a pressure of between 8 MPa (80 bar) and 25 MPa (250 bar).

The selective extraction of free fatty acids in the process is preferably carried out by using a temperature of between 30° C. and 80° C., and a pressure of between 8 MPa (80 bar) and 30 MPa (300 bar) but more preferably a pressure of between 8 MPa (80 bar) and 20 MPa (200 bar).

The pressure and temperature selected would to a certain extent depend on the combination of constituents which are desired. For example, if the main constituent to be extracted is diacylglycerols, the preferred pressure range to be applied would be between 18 MPa (180 bar) and 26 MPa (260 bar). However, if triacylglycerols is also desired, then the upper limit of the pressure range may be increased to 30 MPa (300 bar) in order to extract both diacylglycerols and triacylglycerols.

Vegetable oil products of various compositions containing one or more constituents mentioned above, which may be produced by the process of the invention include palm oil products, palm kernel oil products, soya bean oil products, rice bran oil products, rapeseed oil products, sunflower seed oil products, corn oil products and coconut oil products. Palm oil refers to oil obtained from the palm mesocarp (fibrous layer). Palm kernel oil refers to oil obtained from the palm endosperm (kernel).

The process may be used to produce a wide range of specialty vegetable oil products of various compositions containing one or more of the constituents mentioned above and these specialty vegetable oil products include
(i) high diacylglycerols vegetable oil product
(ii) low partial acylglycerols (monoacyglycerols and diacylglycerols) vegetable oil product
(iii) high carotenes vegetable oil product
(iv) carotenes enriched vegetable oil product
(v) tocols enriched vegetable oil product
(vi) phytosterols enriched vegetable oil product
(vii) squalene enriched vegetable oil product
(viii) concentrated free fatty acids vegetable oil product For the purpose of this specification, the terminologies in the preceding paragraph have the following meanings. High diacylglycerols vegetable oil product is vegetable oil product which contains a minimum of 10% diacyglycerols by weight of the total weight of the vegetable oil product. Low partial acylglycerols vegetable oil product is vegetable oil product which contains a maximum of 5% partial acylglycerols by weight of the total weight of the vegetable oil product. Partial acyglycerols are monoacylglycerols or diacylglycerols or a combination thereof. High carotenes vegetable oil is vegetable oil product which contains a minimum of 0.1% carotenes by weight of the total weight of the vegetable oil product. Carotenes enriched vegetable product is vegetable oil product which contains a minimum of 1% carotenes by weight of the total weight of the vegetable oil product. Tocols enriched vegetable oil product is vegetable oil product which contains a minimum of 0.35% tocols by weight of the total weight of the vegetable oil product. Tocols may comprise, inter alia, tocopherols or tocotrienols or tocoenol or a combination thereof. Phytosterols enriched vegetable oil product is vegetable oil product which contains a minimum of 0.2% phytosterols by weight of the total weight of the vegetable oil product. Phytosterols may comprise, inter alia, campesterol or stigmasterol or β-sitosterol or a combination thereof. Squalene enriched vegetable oil product is vegetable oil product which contains a minimum of 0.25% squalene by weight of the total weight of the vegetable oil product. Concentrated free fatty acids vegetable oil product is vegetable oil product which contains 80%-100% free fatty acids by weight of the total weight of the vegetable oil product.

Vegetable oil products may include, but are not restricted to, edible vegetable oils.

The vegetable oil sources used in the process to produce the vegetable oil products need not undergo pretreatment prior to the extraction of the desired constituents by supercritical fluid extraction. Thus the process may be used to produce vegetable oil products containing one or more of the desired constituents by extracting the desired constituents directly from, for example, crude palm oil (CPO), crude palm olein, crude palm stearin, palm oil by-products such as palm fatty acids distillates, crude palm kernel oil, crude palm kernel olein or crude palm kernel stearin. This is an advantage of the process over the prior art since the process does not require pre-treatment of the feed material and is thus relatively simple. However, pre-treated vegetable oil sources may also be used by the process to produce the desired vegetable oil products. For example, RBD (refined, bleached and deodorized) palm oil, RBD palm olein or RBD palm stearin may be used in the process to produce palm oil products containing one or more of the desired constituents mentioned above. Likewise, RBD palm kernel oil, RBD palm kernel olein or RBD palm kernel stearin may be used in the process to produce palm kernel oil products containing one or more of the desired constituents mentioned above. It must, however, be noted that in order to produce vegetable oil products from pre-treated vegetable oil sources, care should be taken to ensure that the type of pre-treatment must not have destroyed the desired oil components namely monoacylglycerols, diacylglycerols or triacylglycerols or the desired combination thereof. In addition to the aforesaid, care must also be taken to ensure that the type of pre-treatment used does not destroy any of the desired minor constituents or desired free fatty acids for the particular specialty vegetable oil product.

Specialty vegetable oil products which may be produced by the process may be of various compositions. The term "specialty" is used because the compositions of the vegetables oil products produced by the process are different from any known existing oil product compositions. The said specialty vegetable oil products include edible oils and oil products enriched with one or more of the aforementioned constituents. For example, the process may produce any of the following compositions of vegetable oil products from vegetable oil sources:
(i) A vegetable oil product comprising 10%-100% by weight of diacylglycerols
(ii) A vegetable oil product comprising monoacylglycerols, triacylglycerols, carotenes, tocols, squalene, phytosterols and 10%-100% by weight of diacylglycerols
(iii) A vegetable oil product comprising monoacylglycerols of less than 10% by weight, triacylglycerols of 10%-90% by weight, carotenes of 0.05% or more by weight, tocols of 0.05% or more by weight, squalene of 0.01% or more by weight and phytosterols of 0.01% or more by weight
(iv) A vegetable oil product comprising not more than 5% by weight of monoacylglycerols and diacylglycerols
(v) A vegetable oil product comprising triacylglycerols, carotenes, tocols and not more than 5% by weight of monoacylglycerols and diacylglycerols
(vi) A vegetable oil product comprising not more than 5% by weight of monoacylglycerols and diacylglycerols, 10%-90% by weight of triacylglycerols, 0.05% or more by weight of carotenes, and 0.03% or more by weight of tocols
(vii) A vegetable oil product comprising at least 0.1% by weight of carotenes
(viii) A vegetable oil product comprising triacylglycerols and at least 0.1% by weight of carotenes.

Tocols in the above vegetable oil products may comprise, inter alia, tocopherols or tocotrienols or tocoenol, or a combination thereof. Sterols in the vegetable oil products may comprise, inter alia, campesterol or stigmasterol or β-sitosterol or a combination thereof.

Vegetable oil products in the form of edible oils which may be produced by the process of the invention includes the following:
(a) An edible oil comprising 10%-100% by weight of diacylglycerols.
(b) An edible oil comprising monoacylglycerols, triacylglycerols, carotenes, tocols, squalene, phytosterols and 10%-100% by weight of diacylglycerols.
(c) An edible oil wherein monoacyglycerols are less than 10% by weight, triacylglycerols are 10%-90% by weight, carotenes are 0.05% or more by weight, tocols are 0.05% or more by weight, squalene is 0.01% or more by weight and phytosterols are 0.01% or more by weight.
(d) An edible oil comprising not more than 5% by weight of partial acylglycerols (namely monoacylglycerols and diacylglycerols).

(e) An edible oil comprising triacylglycerols, carotenes, tocols, and not more than 5% by weight of partial acyglycerols (namely monoacylglycerols and diacylglycerols)
(f) An edible oil comprising 10%-99% by weight of triacylglycerols, 0.05% or more by weight of carotenes, and 0.03% or more by weight of tocols
(g) An edible oil comprising of at least 0.1% by weight of carotenes.
(h) An edible oil comprising triacylglycerols and at least 0.1% by weight of carotenes.

Tocols in the above edible oils may comprise, inter alia, tocopherols or tocotrienols or tocoenol, or a combination thereof. Phytosterols in the edible oils may comprise, inter alia, campesterol or stigmasterol or β-sitosterol or a combination thereof.

The process may also produce vegetable oil products enriched in certain constituents including useful minor constituents, such as carotenes enriched vegetable oil products, tocols enriched vegetable oil products, phytosterols enriched vegetable oil products, squalene enriched vegetable oil products and concentrated free fatty acids vegetable oil product.

Carotenes enriched vegetable oil product which may be produced by the process include:
(i) A carotenes enriched vegetable oil product comprising at least 1.0% by weight of carotenes
(ii) A carotenes enriched vegetable oil product comprising triacylglycerols of not more than 99% by weight and at least 1.0% by weight of carotenes.

Tocols enriched vegetable oil products which may be produced by the process include:
(i) A tocols enriched vegetable oil product comprising at least 0.35% by weight of tocols (which may inter alia, comprise tocopherols or tocotrienols or tocoenol, or a combination thereof).
(ii) A tocols enriched vegetable oil product comprising at least 0.35% by weight of tocols (which may inter alia, comprise tocopherols or tocotrienols or tocoenol, or a combination thereof), 1%-5% by weight of monoacylglycerols, not more than 10% by weight of diacylglycerols, 20%-100% by weight of triacylglycerols and 50%-70% by weight of free fatty acids.

Phytosterols enriched vegetable oil products which may be produced by the process include
(i) A phytosterols enriched vegetable oil product comprising 0.2% by weight or more of phytosterols
(ii) A phytosterols enriched vegetable oil product comprising 0.2% or more by weight of phytosterols, monoacylgycerols of 1%-5% by weight, diacylglycerols of 10%-30% by weight, triacylglycerols of 20%-50% by weight and free fatty acids of 10%-50% by weight.

The phytosterols in the phytosterols enriched vegetable oil products may comprise, inter alia, campesterol or stigmasterol or β-sitosterol, or a combination thereof.

Squalene enriched vegetable oil products which may be produced by the process include
(i) A squalene enriched vegetable oil product comprising 0.25% or more by weight of squalene
(ii) A squalene enriched vegetable oil product comprising 0.25% or more by weight of squalene, 1%-5% by weight of monoacylglycerols, diacylglycerols of 5%-10% by weight, triacylglycerols of 10%-90% by weight and free fatty acids of 1%-10% by weight.

Concentrated free fatty acids vegetable oil product which may be produced by the process include:
(i) A concentrated free fatty acids vegetable oil product comprising 80%-100% free fatty acids by weight
(ii) A concentrated free fatty acids vegetable oil product comprising 80%-100% by weight of free fatty acids, 1%-5% by weight of monoacylgycerols, 10%-20% by weight of diacylglycerols and 10%-20% by weight of triacylglycerols.

The vegetable oil products which may be produced by the process of the invention as described in the preceding paragraphs may be obtained from any type of vegetable, including palm. The process is particularly useful for producing palm oil products from palm oil sources and for producing palm kernel oil products from palm kernel oil sources.

According to another aspect of the invention there is provided a vegetable oil product (including a palm oil product or a palm kernel oil product) comprising one of the following
(i) high diacylglycerols vegetable oil product which includes a minimum of 10% diacylglycerols by weight
(ii) low partial acylglycerols vegetable oil product which includes a maximum of 5% partial acylglycerols (monoacylglycerols and diacylglycerols) by weight
(iii) high carotenes vegetable oil product which includes a minimum of 0.1% carotenes by weight
(iv) carotenes enriched vegetable oil product which includes a minimum of 1% carotenes by weight
(v) tocols enriched vegetable oil product which includes a minimum of 0.35% tocols by weight
(vi) phytosterols enriched vegetable oil product which includes a minimum of 0.2% phytosterols by weight
(vii) squalene enriched vegetable oil product which includes a minimum of 0.25% squalene by weight
(viii) concentrated free fatty acids vegetable oil products which include 80%-100% free fatty acids by weight.

Tocols when present in any of the above vegetable oil product may comprise, inter alia, tocopherols or tocotrienols or tocoenol or a combination thereof. Phytosterols when present in any of the above vegetable oil product may comprise, inter alia, campesterol or stigmasterol or P-sitosterol, or a combination thereof.

Vegetable oil products of this second aspect of the invention may include, but are not restricted to, edible vegetable oils. The vegetable oil products may be derived from any vegetable oil sources which include, but are not restricted to, crude palm oil, crude palm olein, crude palm stearin, RBD (refined, bleached and deodorized) palm oil, RBD palm olein, RBD palm stearin, crude palm kernel oil, crude palm kernel olein, crude palm kernel stearin, RBD palm kernel oil, RBD palm kernel olein, RBD palm kernel stearin and palm oil by-products such as palm fatty acids distillates.

DESCRIPTION OF PREFERRED EMBODIMENTS

For a better understanding of the invention and to show how it may be carried into effect, a number of preferred embodiments thereof will now be described by way of non-limiting examples only. Although the examples only illustrate the use of the process to produce specialty palm oil products and specialty palm kernel oil products from palm oil sources and palm kernel oil sources respectively, it should be noted that the process may be used to produce specialty vegetable oil products from other vegetable oil sources.

Example 1

30.0 g of CPO was loaded into extraction vessel placed in the column oven. The experiment uses isocratic condition of 80° C. and 300 bar. The extracts were collected at the outlet of the back pressure regulator. Fraction 2 collected after 6 hours of extraction was high in diacylglycerols up to 45% enriched with other constituents.

The composition of the oil is as follows:

| Composition | Weight Percentage |
| --- | --- |
| Diacylglycerols | 33-35 |
| Monoacylglycerols | <1 |
| Triacylglycerols | 50-60 |
| Free fatty acids | <10 |
| Carotenes | 0.06 |
| Tocols | 0.01 |
| Phytosterols | 0.01 |

Example 2

30.0 g of refined, bleached and deodorized (RBD) palm olein was loaded into extraction vessel placed in the column oven. The experiment uses isocratic condition of 60° C. and 240 bar. The extracts were collected at the outlet of the back pressure regulator. The extract after 6 hour of extraction was high in diacylglycerols up to 11% enriched with other constituents. The composition of the oil is as follows:

| Composition | Weight Percentage |
| --- | --- |
| Diacylglycerols | 11 |
| Monoacylglycerols | <0.4 |
| Triacylglycerols | >80 |
| Free fatty acids | <0.5 |
| Squalene | 0.02 |
| Phytosterols | 0.02 |

Example 3

30.0 g of CPO was loaded into extraction vessel placed in the column oven. The experiment uses isocratic condition of 40° C. and 220 bar. The extracts were collected at the outlet of the back pressure regulator at interval of 30 minutes. One fraction extracted was high in diacylglycerols up to 55% enriched with other constituents. The composition is as follows:

| Composition | Weight Percentage |
| --- | --- |
| Diacylglycerols | 55 |
| Monoacylglycerols | <1 |
| Triacylglycerols | 40-50 |
| Free fatty acids | <10 |
| Carotenes | 0.06 |
| Tocols | 0.05 |
| Squalene | 0.01 |
| Phytosterols | 0.01 |

Example 4

30.0 g of crude palm olein was loaded into extraction vessel placed in the column oven. The experiment uses isocratic temperature of 40° C. and gradient pressure of 140 bar to 260 bar. The pressure was increased 40 bar for every 6 hours interval. The raffinate was the low partial acylglycerols palm oil enriched with constituents especially carotenes. The composition of the is as follows:

| Composition | Weight Percentage |
| --- | --- |
| Carotenes | 0.12 |
| Tocols | 0.03 |
| Monoacylglycerols | N.D. |
| Diacylglycerols | 0.86 |
| Triacylglycerols | 98.99 |

Note:
N.D. is non-detectable

Example 5

30.0 g of CPO was loaded into extraction vessel placed in the column oven. The experiment uses isocratic condition of 60° C. and pressure of 300 bar for 15 hours. The raffinate was palm oil enriched with carotenes up to 2,676 ppm from the original of 597 ppm. The composition of the oil is as follows:

| Composition | Weight Percentage |
| --- | --- |
| Carotenes | 0.27 |
| Monoacylglycerols | N.D. |
| Diacylglycerols | N.D. |
| Triacylglycerols | >99 |

Note:
N.D. is non-detectable

Example 6

30.0 g of CPO was loaded into extraction vessel placed in the column oven. The experiment uses isoratic condition of 50° C. and pressure of 300 bar 25 hours. The extract was palm oil concentrated with carotenes >10,000 ppm (1.0%) from original CPO of 0.05%. The composition of the product is as follows:

| Composition | Weight Percentage |
| --- | --- |
| Carotenes | 1.0 |
| Monoacylglycerols | N.D. |
| Diacylglycerols | N.D. |
| Triacylglycerols | >98 |

Note:
N.D. is non-detectable

Example 7

20.0 g of CPO was loaded into extraction vessel placed in the column oven. The experiment uses isocratic condition of 40° C. and pressure of 220 bar for 25 hours. The extract was palm oil concentrated with carotenes >16,000 ppm (1.6%) from original CPO of 0.05%. The composition of the product is as follows:

| Composition | Weight Percentage |
| --- | --- |
| Carotenes | 1.6 |
| Monoacylglycerols | N.D. |
| Diacylglycerols | N.D. |
| Triacylglycerols | >98 |

Note:
N.D. is non-detectable

Example 8

30.0 g of CPO was loaded into extraction vessel placed in column oven. The experiment uses isocratic condition 70° C. and pressure of 300 bar for 23 hours. The extract was palm oil concentrated with carotenes >9,000 ppm (0.9%) from original CPO of 0.05%. The composition of the product is as follows:

| Composition | Weight Percentage |
| --- | --- |
| Carotenes | >0.9 |
| Monoacylglycerols | N.D. |
| Diacylglycerols | N.D. |
| Triacylglycerols | >99 |

Note:
N.D. is non-detectable

Example 9

30.0 g of CPO was loaded into extraction vessel placed in the column oven. The experiment uses isocratic condition of 60° C. and pressure of 300 bar for 7 hours with addition of 4% of food grade ethanol as entrainer to enhance the extraction efficiency. The extract was palm oil concentrated 10-folds with carotenes of >5,000 ppm (0.5%) from original CPO of 0.05%. The composition of the product is as follows:

| Composition | Weight Percentage |
| --- | --- |
| Carotenes | 0.5 |
| Monoacylglycerols | N.D. |
| Diacylglycerols | N.D. |
| Triacylglycerols | >99 |

Note:
N.D. is non-detectable

The addition of entrainer decreases the total extraction time but reduces the concentration carotenes extracted.

Example 10

30.0 g of CPO was loaded into extraction vessel placed in the column oven. The experiment uses isocratic condition of 60° C. and pressure of 140 bar for 3 hours. The extract was palm oil concentrated with tocols 3,600 ppm (0.36%) from original CPO of <0.1%. The composition of the product is as follows:

| Composition | Weight Percentage |
| --- | --- |
| Tocols | 0.36 |
| Monoacylglycerols | 1-3 |
| Diacylglycerols | 5-8 |
| Triacylglycerols | 20-25 |
| Free fatty acids | 60-65 |

Note:
N.D. is non-detectable

Example 11

20.0 g of CPO was loaded into extraction vessel placed in the column oven. The experiment uses isocratic condition of 40° C. and pressure of 220 bar for 30 minutes. The extract was palm oil concentrated with tocols 5,880 ppm (>0.5%) from original CPO of <0.1%. The composition of the product is as follows:

| Composition | Weight Percentage |
| --- | --- |
| Tocols | 0.59 |
| Monoacylglycerols | 1-3 |
| Diacylglycerols | 5-8 |
| Triacylglycerols | 20-25 |
| Free fatty acids | 60-65 |

Note:
N.D. is non-detectable

Example 12

30.0 g of CPO was loaded into extraction vessel placed in the column oven. The experiment uses isocratic condition of 60° C. and pressure of 300 bar for 30 minutes with addition 4% of food grade ethanol as entrainer to enhance the extraction efficiency. The extract was palm oil concentrated with tocols 2000 ppm from original CPO of 1,000 ppm. The composition of the product is as follows:

| Composition | Weight Percentage |
| --- | --- |
| Tocols | 0.2 |
| Carotenes | 0.04 |
| Squalene | 0.08 |
| Phytosterols | 0.05 |
| Free fatty Acids | <10 |
| Monoacylglycerols | <0.5 |
| Diacylglycerols | <10 |
| Triacylglycerols | 80 |

Note:
N.D. is non-detectable

The addition of entrainer decreases the total extraction time but reduces the concentration of tocols extracted.

Example 13

30.0 g of CPO was loaded into extraction vessel placed in the column oven. The experiment uses isocratic condition of 50° C. and pressure of 140 bar for 15 hours. The extract was palm oil concentrated with phytosterols (campesterol, stigmasterol and β-sitosterol) of 2,600 ppm (0.26%) from original CPO of <0.04%. The composition of the product is as follows:

| Composition | Weight Percentage |
| --- | --- |
| Phytosterols | 0.26 |
| Monoacylglycerols | 2-3 |
| Diacylglycerols | 28-23 |
| Triacylglycerols | 15-20 |
| Free fatty acids | 40-50 |

Example 14

30.0 g of CPO was loaded into extraction vessel placed in the column oven. The experiment uses isocratic condition of 60° C. and pressure of 300 bar for 2 hours. The extract was palm oil concentratrated with squalene of 2,427 ppm (0.25%) from original CPO of <0.02%. The composition of the product is as follows:

| Composition | Weight Percentage |
| --- | --- |
| Squalene | 0.25 |
| Monoacylglycerols | 0-1 |
| Diacylglycerols | 3-6 |
| Triacylglycerols | 80-90 |
| Free fatty acids | 6-10 |

Example 15

30.0 g of CPO was loaded into extraction vessel placed in the column oven. The experiment uses isocratic condition of 40° C. and pressure of 300 bar for 2 hours. The extract was palm oil concentrated with free fatty acids with up to 90%. The composition of the product is as follows:

| Composition | Weight Percentage |
| --- | --- |
| Free fatty acids | 80-90 |
| Monoacylglycerols | <1 |
| Diacylglycerols | 2-5 |
| Triacylglycerols | 1-5 |

The invention claimed is:

1. A process for producing vegetable oil products containing one or more constituents from a group which includes monoacylglycerols, diacylglycerols, triacylglycerols, carotenes, tocols, phytosterols, squalene and free fatty acids, comprising:
   selectively extracting, without any pre-treatments of one or more source vegetable oils, and without using an adsorbent, from the one or more source vegetable oils, desired constituents and removing unwanted constituents and impurities by manipulating relative solubilities of the constituents and impurities in a supercritical fluid; and manipulating the relative solubilities of the constituents and impurities in the supercritical fluid by keeping a temperature, a flow rate of the supercritical fluid, and a composition of the supercritical fluid constant, and using a gradient pressure.

2. A process for producing vegetable oil products according to claim 1, further comprising manipulating the relative solubilities of the constituents and impurities in the supercritical fluid by adjusting a composition of the supercritical fluid.

3. A process for producing vegetable oil products according to claim 1 or claim 2 wherein the supercritical fluid includes one or more of supercritical propane, supercritical ethylene, and supercritical propylene.

4. A process for producing vegetable oil products according to claim 2, further comprising keeping the temperature, pressure, flow rate of the supercritical fluid, and composition of the supercritical fluid constant.

5. A process for producing vegetable oil products according to claim 4, further comprising using supercritical fluid with an entrainer.

6. A process for producing vegetable oil products according to claim 1 wherein the supercritical fluid includes supercritical carbon dioxide.

7. A process for producing vegetable oil products according to claim 6, further comprising maintaining the temperature at or below 120° C. and maintaining the pressure at or below 60 MPa (600 bar).

8. A process for producing vegetable oil products according to claim 6, further comprising maintaining the temperature in the range of between 25° C. and 120° C., and maintaining the pressure in the range of between 8 MPa (80 bar) and 60 MPa (600 bar).

9. A process for producing vegetable oils products according to claim 6 wherein the selective extraction of monoacylglycerols is carried out by using a temperature of between 30° C. and 80° C., and a pressure of between 8 MPa (80 bar) and 20 MPa (200 bar).

10. A process for producing vegetable oil products according to claim 6 wherein the selective extraction of diacylglycerols is carried out by using a temperature of between 30° C. and 80° C., and a pressure of between 18 MPa (180 bar) and 30 MPa (300 bar).

11. A process for producing vegetable oil products according to claim 10 wherein the selective extraction of diacylglycerols is carried out by using a temperature of between 30° C. and 80° C., and a pressure of between 18 MPa (180 bar) and 26 MPa (260 bar).

12. A process for producing vegetable oil products according to claim 6 wherein the selective extraction of triacylglycerols is carried out by using a temperature of between 30° C. and 80° C., and a pressure of between 10 MPa (100 bar) and 40 MPa (400 bar).

13. A process for producing vegetable oil products according to claim 6 wherein the selective extraction of carotenes is carried out by using a temperature of between 30° C. and 80° C., and a pressure of between 22 MPa (220 bar) and 40 MPa (400 bar).

14. A process for producing vegetable oil products according to claim 13 wherein the selective extraction of carotenes is carried out by using a temperature of between 30° C. and 80° C., and a pressure of between 25 MPa (250 bar) and 40 MPa (400 bar).

15. A process for producing vegetable oil products according to claim 6, further comprising selectively extracting tocols at a temperature of between 30° C. and 80° C., and a pressure of between 10 MPa (100 bar) and 25 MPa (250 bar).

16. A process for producing vegetable oil products according to claim 6 wherein the selective extraction of phytosterols is carried out by using a temperature of between 30° C. and 80° C., and a pressure of between 8 MPa (80 bar) and 22 MPa (220 bar).

17. A process for producing vegetable oil products according to claim 6 wherein the selective extraction of squalene is carried out by using a temperature of between 30° C. and 80° C., and a pressure of between 8 MPa (80 bar) and 30 MPa (300 bar).

18. A process for producing vegetable oil products according to claim 17 wherein the selective extraction of squalene is carried out by using a temperature of between 30° C. and 80° C., and a pressure of between 8 MPa (80 bar) and 25 MPa (250 bar).

19. A process for producing vegetable oil products according to claim 6 wherein the selective extraction of free fatty acids is carried out by using a temperature of between 30° C. and 80° C., and a pressure of between 8 MPa (80 bar) and 30 MPa (300 bar).

20. A process for producing vegetable oil products according to claim 19 wherein the selective extraction of free fatty acids is carried out by using a temperature of between 30° C. and 80° C., and a pressure of between 8 MPa (80 bar) and 20 MPa (200 bar).

21. A process for producing vegetable oil products according to claim 1 or claim 2, further comprising using the supercritical fluid with an entrainer.

22. A process for producing vegetable oil products according to claim 21 wherein the entrainer includes 0.1%-4% by weight of food grade ethanol.

23. A process for producing vegetable oil products according to claim 1, further comprising using supercritical fluid with an entrainer.

24. A process for producing vegetable oil products according to claim 1 wherein the one or more vegetable oils include one or more of palm oil, palm kernel oil, soya bean oil, rice bran oil, rapeseed oil, sunflower seed oil, corn oil, and coconut oil.

25. A process for producing vegetable oil products according to claim 1 wherein the vegetable oil products comprise palm oil products or palm kernel oil products and the one or more vegetable oils comprise palm oil or palm kernel oil, respectively.

26. A process for producing palm oil products according to claim 25, wherein the one or more vegetable oils include palm oil including one or more of crude palm oil, crude palm olein, crude palm stearin, and palm oil by-products.

27. A process for producing palm kernel oil products according to claim 25, wherein the one or more vegetable oils include palm kernel oil including one or more of crude palm kernel oil, crude palm kernel olein, and crude palm kernel stearin.

28. A process for producing vegetable oil products according to any one of claims 7, 8, 24, 25, 26, and 27 wherein the vegetable oil products produced include at least one of:
  (i) Vegetable oil product containing a minimum of 10% diacylglycerols by weight of the total weight of vegetable oil product;
  (ii) Vegetable oil product which contains a maximum of 5% partial acylglycerols (monoacylglycerols and diacylglycerols) by weight of the total weight of the vegetable oil product;
  (iii) Vegetable oil product which contains a minimum of 0.1% carotenes by weight of the total weight of the vegetable oil product;
  (iv) Vegetable oil product which contains a minimum of 1% carotenes by weight of the total weight of the vegetable oil product;
  (v) Vegetable oil product which contains a minimum of 0.35% tocols by weight of the total weight of the vegetable oil product;
  (vi) Vegetable oil product which contains a minimum of 0.2% phytosterols by weight of the total weight of the vegetable oil product;
  (vii) Vegetable oil product which contains a minimum of 0.25% squalene by weight of the total weight of the vegetable oil product; and
  (viii) Vegetable oil product which contains 80%-100% free fatty acids by weight of the total weight of the vegetable oil product.

29. A process for producing vegetable oil products containing one or more constituents from a group which includes monoacylglycerols, diacylglycerols, triacylglycerols, carotenes, tocols, phytosterols, squalene and free fatty acids, comprising:
  selectively extracting, without any pre-treatments of one or more source vegetable oils, and without using an adsorbent, from the one or more source vegetable oils, desired constituents and removing unwanted constituents and impurities by manipulating relative solubilities of the constituents and impurities in a supercritical fluid; and
  manipulating the relative solubilities of the constituents and impurities in the supercritical fluid by keeping a pressure, a flow rate of the supercritical fluid, and a composition of the supercritical fluid constant, and using a gradient temperature.

30. A process for producing vegetable oil products according to any one of claim 4 and claim 29, wherein the supercritical fluid includes supercritical carbon dioxide.

31. A process for producing vegetable oil products according to claim 29, further comprising using supercritical fluid with an entrainer.

* * * * *